United States Patent
Obora

(10) Patent No.: US 11,999,342 B2
(45) Date of Patent: Jun. 4, 2024

(54) DISPLAY CONTROL DEVICE, PARKING ASSIST APPARATUS AND DISPLAY CONTROL METHOD

(71) Applicant: Panasonic Intellectual Property Management Co., Ltd., Osaka (JP)

(72) Inventor: Michio Obora, Kanagawa (JP)

(73) Assignee: PANASONIC AUTOMOTIVE SYSTEMS CO., LTD., Kanagawa (JP)

( * ) Notice: Subject to any disclaimer, the term of this patent is extended or adjusted under 35 U.S.C. 154(b) by 379 days.

(21) Appl. No.: 17/331,234

(22) Filed: May 26, 2021

(65) Prior Publication Data

US 2022/0379876 A1 Dec. 1, 2022

(51) Int. Cl.

| | |
|---|---|
| *B60W 30/06* | (2006.01) |
| *B60W 50/14* | (2020.01) |
| *G06T 7/70* | (2017.01) |
| *G06V 20/58* | (2022.01) |
| *G08G 1/14* | (2006.01) |
| *H04N 7/18* | (2006.01) |
| *H04N 23/90* | (2023.01) |

(52) U.S. Cl.
CPC ............ *B60W 30/06* (2013.01); *B60W 50/14* (2013.01); *G06T 7/70* (2017.01); *G06V 20/584* (2022.01); *G06V 20/586* (2022.01); *G08G 1/142* (2013.01); *H04N 7/181* (2013.01); *B60W 2050/146* (2013.01); *B60W 2552/00* (2020.02); *B60W 2554/20* (2020.02); *G06T 2207/30264* (2013.01); *H04N 23/90* (2023.01)

(58) Field of Classification Search
CPC .............. B60W 30/06; B60W 50/14; B60W 2050/146; B60W 2552/00; G06T 7/70; G06V 20/584; G06V 20/586; G08G 1/142; H04N 7/181
See application file for complete search history.

(56) References Cited

U.S. PATENT DOCUMENTS

| | | | |
|---|---|---|---|
| 2010/0228426 A1 | 9/2010 | Suzuki et al. | |
| 2018/0111553 A1 | 4/2018 | Kubota et al. | |
| 2018/0308358 A1* | 10/2018 | Hayakawa | G08G 1/143 |

FOREIGN PATENT DOCUMENTS

| | | |
|---|---|---|
| JP | 2009-083735 | 4/2009 |
| JP | 2010-028432 | 2/2010 |
| JP | 2020-147229 | 9/2020 |
| WO | 2016/158984 | 10/2016 |
| WO | 2017/179206 | 10/2017 |

OTHER PUBLICATIONS

English language translation of Office Action from Japan Patent Office (JPO) in Japanese Patent Appl. No. 2019-048278, dated Oct. 18, 2022.

* cited by examiner

*Primary Examiner* — Kenneth J Malkowski

(74) *Attorney, Agent, or Firm* — Greenblum & Bernstein, P.L.C.

(57) ABSTRACT

Provided is a display control apparatus that generates a display overhead image including overhead images of each of a vacant parking space and a vehicle and outputs the display overhead image to a display apparatus. The display overhead image includes at least one of an overhead image of the vacant parking space outside of a current viewing angle of a vehicle-mounted camera and an overhead image of the vacant parking space hidden behind a static object as seen from a current position of the vehicle.

20 Claims, 7 Drawing Sheets

DISPLAY CONTROL DEVICE, PARKING ASSIST APPARATUS AND DISPLAY CONTROL METHOD

TECHNICAL FIELD

The present disclosure relates to a display control apparatus, a parking assistance apparatus, and a display control method.

BACKGROUND ART

For example, the related art discloses a parking assistance apparatus that converts an image of a vacant parking space captured by a camera for capturing the periphery of a vehicle to an overhead image, generates a display image by combining an image indicating this vehicle with respect to the overhead image, and displays the display image.

CITATION LIST

Patent Literature

PTL 1
Japanese Patent Application Laid-Open No. 2009-083735

Solution to Problem

A display control apparatus according to an aspect of the present disclosure includes: a receiver that, for each detection of a vacant parking space present in a periphery of a vehicle, receives locational information on the vacant parking space and a captured image of the vacant parking space captured by a camera mounted on the vehicle and stores, in a storage, the locational information on the vacant parking space and the captured image of the vacant parking space in association with each other; and a generator that generates an overhead image of the vacant parking space based on a captured image of the vacant parking space captured at a position where the vehicle has been positioned before a current point in time, generates a display overhead image including at least the overhead image of the vacant parking space and the overhead image of the vehicle based on positional information on each of the vacant parking space and the vehicle, and outputs the display overhead image to a display apparatus mounted on the vehicle, wherein the display overhead image to be displayed on the display apparatus includes at least one of an overhead image of the vacant parking space outside of a current viewing angle of the camera and an overhead image of the vacant parking space hidden behind a static object as seen from a current position of the vehicle.

A parking assistance apparatus according to an aspect of the present disclosure includes: a detector that detects a vacant parking space present in a periphery of a vehicle; a traveling controller that controls traveling of the vehicle and automatically parks the vehicle in the vacant parking space; a receiver that, for each detection of the vacant parking space by the detector, receives locational information on the vacant parking space and a captured image of the vacant parking space captured by a camera mounted on the vehicle and stores the locational information on the vacant parking space and the captured image of the vacant parking space in association with each other; and a generator that generates an overhead image of the vacant parking space based on a captured image of the vacant parking space captured at a position where the vehicle has been positioned before a current point in time, generates a display overhead image including at least the overhead image of the vacant parking space and the overhead image of the vehicle based on positional information on each of the vacant parking space and the vehicle, and outputs the display overhead image to a display apparatus mounted on the vehicle, wherein the display overhead image to be displayed on the display apparatus includes at least one of an overhead image of the vacant parking space outside of a current viewing angle of the camera and an overhead image of the vacant parking space hidden behind a static object as seen from a current position of the vehicle.

A display control method according to an aspect of the present disclosure is performed by an apparatus mounted on a vehicle, the display control method including: receiving, for each detection of a vacant parking space present in a periphery of the vehicle, locational information on the vacant parking space and a captured image of the vacant parking space captured by a camera mounted on the vehicle and storing the locational information on the vacant parking space and the captured image of the vacant parking space in association with each other; and generating an overhead image of the vacant parking space based on a captured image of the vacant parking space captured at a position where the vehicle has been positioned before a current point in time, generating a display overhead image including at least the overhead image of the vacant parking space and the overhead image of the vehicle based on positional information on each of the vacant parking space and the vehicle, and outputting the display overhead image to a display apparatus mounted on the vehicle, wherein the display overhead image to be displayed on the display apparatus includes at least one of an overhead image of the vacant parking space outside of a current viewing angle of the camera and an overhead image of the vacant parking space hidden behind a static object as seen from a current position of the vehicle.

Advantageous Effects of Invention

According to the present disclosure, an occupant of a vehicle can easily recognize a location of a vacant parking space.

DESCRIPTION OF EMBODIMENTS

Figure 1:
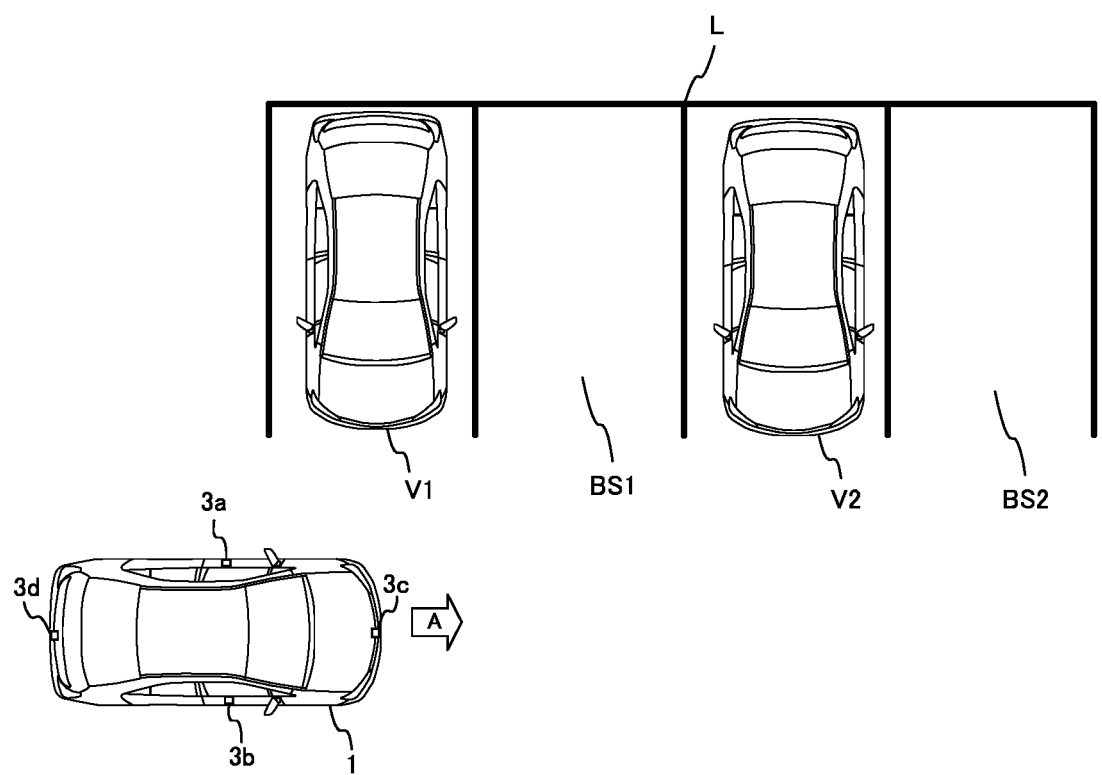
FIG. 1 is a schematic view of an exemplary positional relationship of a vehicle, a parked vehicle, and a vacant parking space, which is provided for describing findings leading the present disclosure.

Findings leading to the present disclosure will be described with reference to FIG. 1. FIG. 1 is a schematic view of an exemplary positional relationship of a vehicle, parked vehicles, and vacant parking spaces. FIG. 1 illustrates each of the vehicles, parked vehicles, and vacant parking spaces, in a state as seen from directly above. In the present description, a "parked vehicle" refers to a vehicle that has been parked and that is other than a vehicle which is to be parked (hereinafter, referred to as a "subject vehicle"). In addition, a "vacant parking space" refers to a parking space where no other vehicle is parked.

Parked vehicles V1 and V2 illustrated in FIG. 1 are vehicles other than a subject vehicle and parked in parallel in parking spaces delimited by division line L (here, the space where one vehicle can park in parallel). Moreover, each of parking spaces BS1 and BS2 illustrated in FIG. 1 is a vacant parking space.

Vehicle 1 illustrated in FIG. 1 is, for example, a vehicle that performs automatic parking (e.g., a passenger vehicle).

In the present description, an "automatic parking" may be an automatic parking performed without requiring any driving operations performed by an occupant of the vehicle or may be an automatic parking performed without requiring some driving operations by the occupant of the vehicle. The former is, for example, an operation in which a parking assistance apparatus mounted on the vehicle guides and parks the vehicle in a vacant parking space by controlling acceleration, deceleration, braking, and steering of the vehicle (i.e., by complete automatic driving) without requiring operations for acceleration, deceleration, braking, and steering. The latter is, for example, an operation in which the parking assistance apparatus mounted on the vehicle guides and parks the vehicle in a vacant parking space by controlling the steering without requiring the operation for steering and by controlling the acceleration, deceleration and braking based on the operation of the occupant of the vehicle.

Here, as an example, a vacant parking space is assumed to be detected based on an image captured by a vehicle-mounted camera mounted on vehicle 1 (hereinafter, referred to as a "captured image"). Note that, since a publicly known method can be used for detecting the vacant parking space based on the captured image, a description thereof will be omitted here.

As illustrated in FIG. 1, vehicle 1 includes left side camera 3a for capturing a left side of vehicle 1, right side camera 3b for capturing a right side of vehicle 1, front camera 3c for capturing a front side of vehicle 1, and rear camera 3d for capturing the rear of vehicle 1. Incidentally, FIG. 1 illustrates an exemplary case where a single camera unit is provided for each camera; however, a plurality of camera units may be provided for each camera.

For example, assuming that vehicle 1 at the position illustrated in FIG. 1 moves slowly to traveling direction A while capturing with each camera so as to search for a vacant parking space, and as a result, parking spaces BS1 and BS2 are detected as vacant parking spaces and parked vehicles V1 and V2 are detected as static objects based on captured images.

Additionally, for example, in a case where an occupant of vehicle 1 performs an operation instructing displaying of an overhead image, a conventional apparatus (e.g., the apparatus of PTL 1) converts the captured image to the overhead image and combines an image of vehicle 1 (e.g., an image of vehicle 1 in a state as seen from directly above) with respect to the overhead image to display.

Here, for example, from among vacant parking spaces BS1 and BS2 detected as parking spaces, in a case where parking space BS1 is outside of a viewing angle of left side camera 3a, an overhead image to be displayed does not include an image indicating parking space BS1. As a result, the occupant of vehicle 1 cannot recognize a location of parking space BS1 detected as the vacant parking space even when seeing the displayed overhead image.

An object of the present disclosure is to enable the occupant of the vehicle to easily recognize the location of the detected vacant parking space.

The findings leading to the present disclosure has been described above.

Hereinafter, an embodiment of the present disclosure will be described with reference to the accompanying drawings. Note that, in all the drawings, an element the same as a precedent element is given the same reference numeral, and the description thereof may be omitted.

Figure 2:
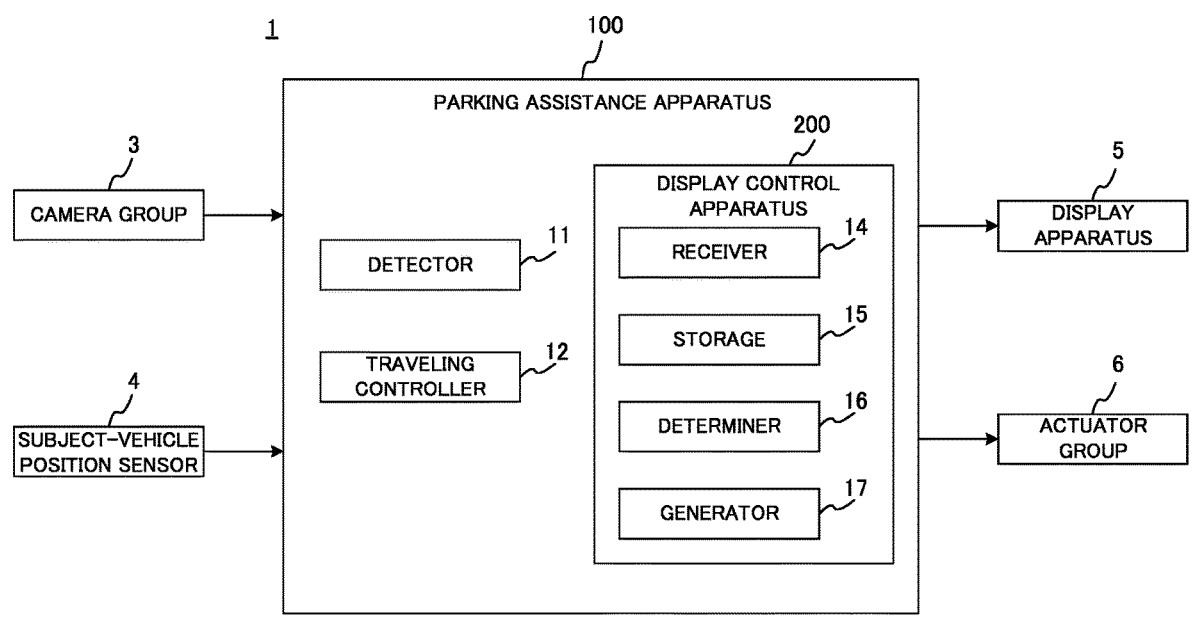
FIG. 2 is a block diagram illustrating an exemplary configuration of a parking assistance apparatus according to an embodiment of the present disclosure.

A configuration of parking assistance apparatus 100 according to the present embodiment will be described with reference to FIG. 2. FIG. 2 is a block diagram illustrating an exemplary configuration of parking assistance apparatus 100 according to the present embodiment.

Parking assistance apparatus 100 illustrated in FIG. 2 is mounted on, for example, vehicle 1 illustrated in FIG. 1. Moreover, parking assistance apparatus 100 is electrically connected to camera group 3, subject-vehicle position sensor 4, display apparatus 5 and actuator group 6, which are mounted on vehicle 1.

Camera group 3 includes, for example, left side camera 3a, right side camera 3b, front camera 3c, and rear camera 3d, which are illustrated in FIG. 1. In the following, the cameras included in camera group 3 are referred to as "each camera." Each camera outputs the captured images obtained by capturing to parking assistance apparatus 100.

Capturing processing and captured image output processing by each camera are performed repeatedly during a search for a vacant parking space (e.g., while vehicle 1 is traveling along traveling direction A in FIG. 1).

Subject-vehicle position sensor 4 detects a position and orientation of vehicle 1 based on, for example, signals received from Global Positioning System (GPS) satellites (not illustrated) and outputs the subject vehicle position information indicating the detected position and orientation of vehicle 1 to parking assistance apparatus 100.

The above processing by subject-vehicle position sensor 4 is performed repeatedly during the search for the vacant parking space (e.g., while vehicle 1 is traveling along traveling direction A in FIG. 1).

Note that, in the above embodiment, a description will be given with an example of detecting the position and orientation of vehicle 1 using subject-vehicle position sensor 4, the position and orientation of vehicle 1 may be detected using a publicly known measure and method other than subject-vehicle position sensor 4.

Furthermore, although FIG. 2 illustrates only subject-vehicle position sensor 4, vehicle 1 is equipped with, for example, various sensors such as an accelerator position sensor detecting a position of an accelerator pedal, a shift position sensor detecting a position of a shift lever, a steering angle sensor detecting a steering angle, and a wheel speed sensor detecting the rotational speed of each wheel of vehicle 1. Each of these sensors is electrically connected to parking assistance apparatus 100 and outputs a signal indicating a detection result to parking assistance apparatus 100. These signals are used when parking assistance apparatus 100 automatically parks vehicle 1.

Display apparatus 5 is provided in the interior of vehicle 1 and displays the overhead images (described in detail later) indicating vehicle 1 and the periphery of vehicle 1.

Actuator group 6 is an actuator group that executes acceleration, deceleration, braking, steering, and the like of vehicle 1. Actuator group 6 includes, for example, various actuators such as a motor actuator executing acceleration and deceleration, a brake actuator executing braking, and a steering actuator executing steering.

Parking assistance apparatus 100 is an apparatus that detects a vacant parking space and automatically parks vehicle 1 in the vacant parking space.

Figure 7:
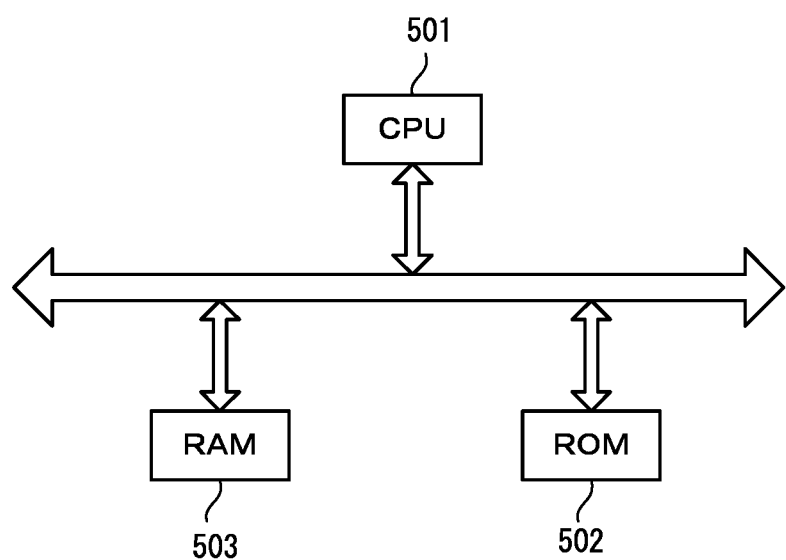
FIG. 7 illustrates an exemplary hardware configuration of a computer included in the parking assistance apparatus according to an embodiment of the present disclosure.

As illustrated in FIG. 7, parking assistance apparatus 100 includes as hardware, for example, Central Processing Unit (CPU) 501, Read Only Memory (ROM) 502 storing a computer program, and Random Access Memory (RAM) 503. CPU 501, ROM 502, and RAM 503 are connected to each other.

Functions of the respective parts of parking assistance apparatus 100 and display control apparatus 200 (see FIG. 2) described below are realized by executing the computer program read by CPU 501 from ROM 502. Moreover, the computer program may be stored in a predetermined recording medium and provided to a user or the like.

Parking assistance apparatus 100 includes detector 11, traveling controller 12, and display control apparatus 200.

Detector 11 detects positions of each vacant parking space and each static object based on captured images received from each camera. The static object may be, but is not limited to, a parked vehicle, a shopping cart, a cone, or the like that is present in a parking space. Incidentally, since a publicly known method can be used for detecting the positions of each vacant parking space and each static object based on the captured image, a description thereof will be omitted here.

The above processing by detector 11 is performed repeatedly during the search for the vacant parking space (e.g., while vehicle 1 is traveling along traveling direction A in FIG. 1).

Traveling controller 12 controls actuator group 6 such that vehicle 1 automatically parks in the vacant parking space detected by detector 11. This control causes vehicle 1 to automatically park in the vacant parking space. Note that, the vacant parking space in which automatic parking is performed may be determined by an operation of the occupant of vehicle 1 or may be determined by parking assistance apparatus 100 without the operation of the occupant of vehicle 1.

Next, display control apparatus 200 will be described.

Display control apparatus 200 is an apparatus that controls displaying of an image on display apparatus 5. Specifically, display control apparatus 200 generates an overhead image (in particular, any one of the first to third overhead images to be described later) indicating vehicle 1 and its periphery and outputs the overhead image to display apparatus 5.

As illustrated in FIG. 2, display control apparatus 200 includes receiver 14, storage 15, determiner 16, and generator 17.

Receiver 14 receives locational information on the vacant parking space detected by detector 11 and an image of the vacant parking space captured by at least one of each camera (hereinafter, referred to as a "captured image of the vacant parking space") to store them in storage 15 in association with each other.

In addition, receiver 14 receives the position information on the static object detected by detector 11 and an image of the static object captured by at least one of each camera (hereinafter, referred to as a "captured image of the static object") to store them in storage 15 in association with each other.

Storage 15, under the control of receiver 14, stores the locational information on the vacant parking space and the captured image of the vacant parking space in association with each other.

Storage 15, under the control of receiver 14, also stores the positional information on the static object and the captured image of the static object in association with each other.

Moreover, storage 15 stores a prepared subject-vehicle image. The subject-vehicle image is an overhead image of vehicle 1.

Furthermore, storage 15 stores a prepared notification image. The notification image is an image for notifying the occupant of vehicle 1 that the vacant parking space is detected. For example, the notification image is an image indicating the detection of the vacant parking space, using characters or illustrations.

Note that, although FIG. 2 illustrates an exemplary case where storage 15 is provided in display control apparatus 200, storage 15 may be provided outside display control apparatus 200 or outside parking assistance apparatus 100.

Determiner 16 performs various kinds of determination processing based on the detection result of detector 11. The determination processing will be described in detail later.

Generator 17 generates an overhead image based on images read from storage 15 (e.g., the captured images captured by each of left side camera 3*a*, right side camera 3*b*, front camera 3*c*, and rear camera 3*d* and the subject-vehicle image) and outputs the overhead image to display apparatus 5. The overhead image is thus displayed on display apparatus 5. Processing of generating the overhead image performed by generator 17 will be described in detail later. Besides, the first to third overhead images to be described later, which are generated and output by generator 17 to display apparatus 5, correspond to an example of a "display overhead image."

Display control apparatus 200 has been described above.

Figure 3:
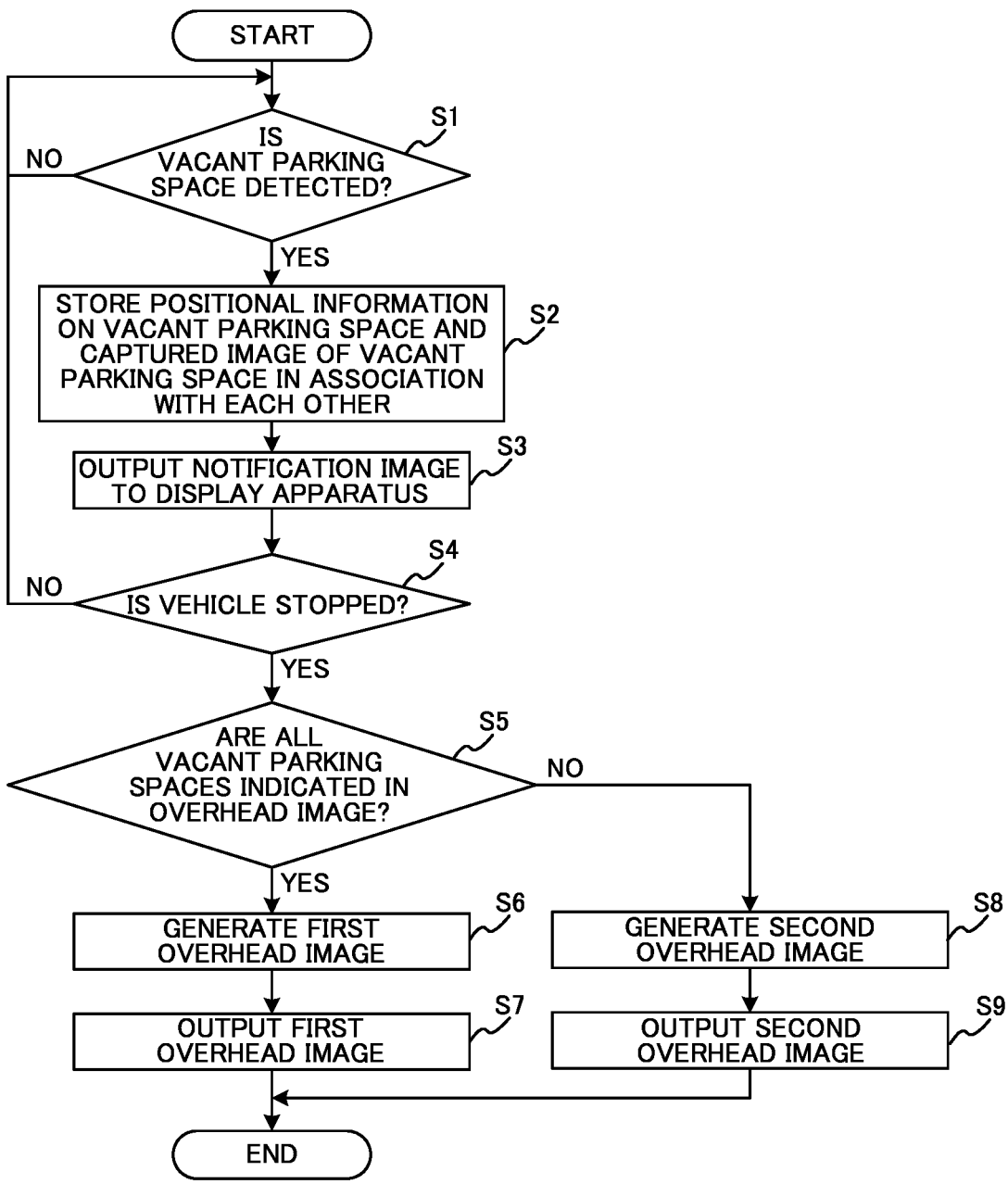
FIG. 3 is a flowchart illustrating an exemplary operation of a display control apparatus according to the embodiment of the present disclosure.

Next, an operation of display control apparatus 200 will be described with reference to FIG. 3. FIG. 3 is a flowchart illustrating an exemplary operation of display control apparatus 200.

A flow of FIG. 3 starts at the beginning of a search for a vacant parking space. Incidentally, as described above, the respective kinds of processing by each camera, subject-vehicle position sensor 4, and detector 11 are repeatedly performed during the search for the vacant parking space.

First, determiner 16 determines whether a vacant parking space is detected by detector 11 (step S1).

In a case where a vacant parking space is not detected by detector 11 (step S1: NO), the flow returns to step S1.

On the other hand, in a case where the vacant parking space is detected by detector 11 (step S1: YES), receiver 14 receives the locational information on the vacant parking space detected by detector 11 and the captured image of the vacant parking space captured by at least one of each camera to store them in storage 15 in association with each other (step S2). The processing of step S2 is performed for each detection of the vacant parking space.

Next, generator 17 reads the notification image from storage 15 and outputs the notification image to display apparatus 5 (step S3).

Thus, display apparatus 5 displays the notification image. Accordingly, the occupant of vehicle 1 can recognize that the vacant parking space is detected. Note that, the process of step S3 may be performed for each detection of the vacant parking space.

Next, determiner 16 determines whether vehicle 1 is stopped (step S4).

Here, in a case where vehicle 1 is not stopped (step S4: NO), the flow returns to step S1.

On the other hand, when vehicle 1 is stopped (step S4: YES), determiner 16 determines whether all the vacant spaces detected by detector 11 are indicated in an overhead image to be generated (step S5).

For example, determiner 16 determines whether all the vacant spaces detected are indicated in the overhead image to be generated on the basis of the locational information on all the vacant parking spaces read from storage 15, subject-vehicle positional information received from subject-vehicle position sensor 4 (here, information indicating a stopping position of vehicle 1), and the viewing angle of each camera.

In a case where all the vacant parking spaces are indicated in the overhead image (step S5: YES), the flow proceeds to steps S6 and S7. On the other hand, in a case where not all the vacant parking space are indicated in the overhead image (step S5: NO), the flow proceeds to steps S8 and S9.

First, steps S6 and S7 will be described.

Generator 17 generates the first overhead image based on the images captured by each camera in a current position (e.g., the stopping position) of vehicle 1 (hereinafter collectively referred to as a "current position captured image") and the subject-vehicle image (step S6).

The first overhead image is a conventional and common overhead image. Here, for step S6, a description will be given with an example in which one vacant parking space is detected, and a captured image of the vacant parking space is included in the current position captured image.

First, generator 17 performs, for example, distortion correction processing or projection conversion processing on the current position captured image read from storage 15 (including the captured image of the detected vacant parking space). Generator 17 then generates the first overhead image by combining the current position overhead image (including the overhead image of the detected vacant parking space) obtained by the processing and the subject-vehicle image read from storage 15. During this generation, generator 17 performs an arrangement of the subject-vehicle image and the overhead image of the vacant parking space based on the subject-vehicle positional information received from subject-vehicle position sensor 4 (here, the information indicating the stopping position of vehicle 1) and the locational information of the detected vacant parking space.

Next, generator 17 outputs the first overhead image generated in step S6 to display apparatus 5 (step S7).

Thus, display apparatus 5 displays the first overhead image generated in step S6.

Next, steps S8 to S9 will be described.

Generator 17 generates the second overhead image based on the current position captured image, the subject-vehicle image, and the images captured by each camera at a position where vehicle 1 has been positioned (e.g., a position during traveling) before the current point in time (e.g., at the time of stopping) (hereinafter collectively referred to as a "past position captured image") (step S8).

Here, for step S8, a description will be given with an example in which the detected vacant parking spaces are two parking spaces BS1 and BS2 illustrated in FIG. 1, a captured image of parking space BS2 is included in the current position captured image, and a captured image of parking space BS1 is included in the past position captured image (e.g., parking space BS1 is outside the viewing angle of each camera in the current position of vehicle 1).

First, generator 17 performs, for example, distortion correction processing or projection conversion processing on the current position captured image read from storage 15 (including the captured image of parking space BS2 which is detected). Generator 17 then generates the first overhead image by combining the current position overhead image obtained by the processing (including the overhead image of parking space BS2 which is detected) and the subject-vehicle image read from storage 15. In this generation, generator 17 performs arrangement of the subject-vehicle image and the overhead image of parking space BS2 based on the subject-vehicle positional information received from subject-vehicle position sensor 4 (here, the information indicating the stopping position of vehicle 1) and the positional information of parking space BS2.

Next, generator 17 performs, for example, distortion correction processing or projection conversion processing on the past position captured image (including the captured image of parking space BS1 which is detected) read from storage 15 and thereby obtains a past position overhead image (including the overhead image of parking space BS1 which is detected).

Generator 17 then generates the second overhead image by combining the past position overhead image (including the overhead image of parking space BS1) with respect to the first overhead image including the subject-vehicle image and the current position overhead image (including the overhead image of parking space BS2). During this generation, generator 17 performs an arrangement of the overhead image of parking space BS1 based on the locational information on parking space BS1 read from storage 15. At this time, the respective images in the second overhead image may be adjusted (reduced) in size depending on a display range of an image on display apparatus 5.

The second overhead image generated in this manner includes, unlike the first overhead image, the overhead image of the vacant parking space generated based on the captured image of the vacant parking space captured at the position where vehicle 1 has been positioned before the current point in time. That is, the second overhead image includes an overhead image generated from the image captured at the position where vehicle 1 has been positioned before the position where the image used for generating the first overhead image is captured.

Step S8 has been described above, but the processing order in step S8 is not limited to the above description.

Next, generator 17 outputs the second overhead image generated in step S8 to display apparatus 5 (step S9).

Figure 4:
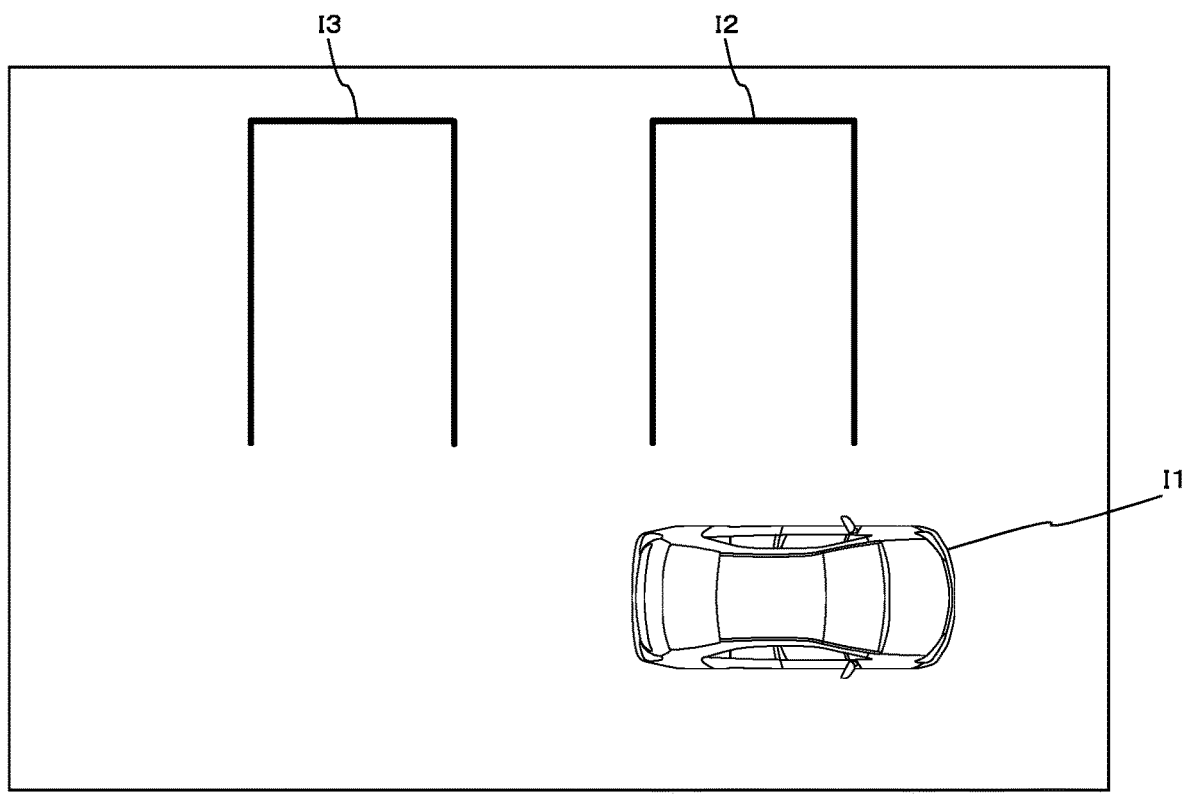
FIG. 4 is a schematic view of an exemplary overhead image according to the embodiment of the present disclosure.

Thus, display apparatus 5 displays the second overhead image generated in step S8. FIG. 4 illustrates an example of the second overhead image displayed on apparatus 5.

As illustrated in FIG. 4, the second overhead image includes subject-vehicle image I1 indicating vehicle 1, parking space image I2 indicating parking space BS2 which is the detected vacant parking space, and parking space image I3 indicating parking space BS1 which is the detected vacant parking space.

Incidentally, step S8 has been described above with an example with an example in which the parking space outside the viewing angle of each camera in the current position of vehicle 1 is only parking space BS1 among the detected vacant parking spaces, but the present disclosure is not limited to this. In a case where there is a plurality of parking spaces outside the viewing angle of each camera in the current position of vehicle 1 among the detected vacant parking spaces, the second overhead image is generated to include overhead images of these parking spaces.

Furthermore, step S8 has been described above with an example with an example in which the current position captured image includes only the captured image of parking space BS2 which is detected, but the present disclosure is not limited to this. In a case where another vehicle parks in parking space BS2 and a captured image of the other vehicle is included in the current position captured image, the second overhead image illustrated in FIG. 4 is assumed to include only parking space image I3 and not to include parking space image I2.

The operation of display control apparatus 200 has been described above.

As described in detail above, according to the present embodiment, even when the detected vacant parking space is outside a current viewing angle of each camera, vehicle 1 generates the overhead image of the vacant parking space based on the image of the vacant parking space captured at the position where vehicle 1 has been positioned before the current point in time, generates then the second overhead image including the overhead image of the vacant parking space, and displays the second overhead image. Consequently, the occupant of vehicle 1 can easily recognize a location of the detected vacant parking space.

The embodiment described above can be variously modified without departing from the spirit thereof. Hereinafter, variations will be described.

[Variation 1]

In the above embodiment, it has been described that in a case where the detected vacant parking space is outside the viewing angle of each camera in the current position of vehicle 1, there arises the problem in that the occupant of vehicle 1 cannot recognize the location of the vacant parking space. Similarly, the same problem arises in a case where the detected vacant parking space is hidden behind a static object adjacent thereto as seen from the current position of vehicle 1. An object of the present variation is to solve the problem.

Figure 5:
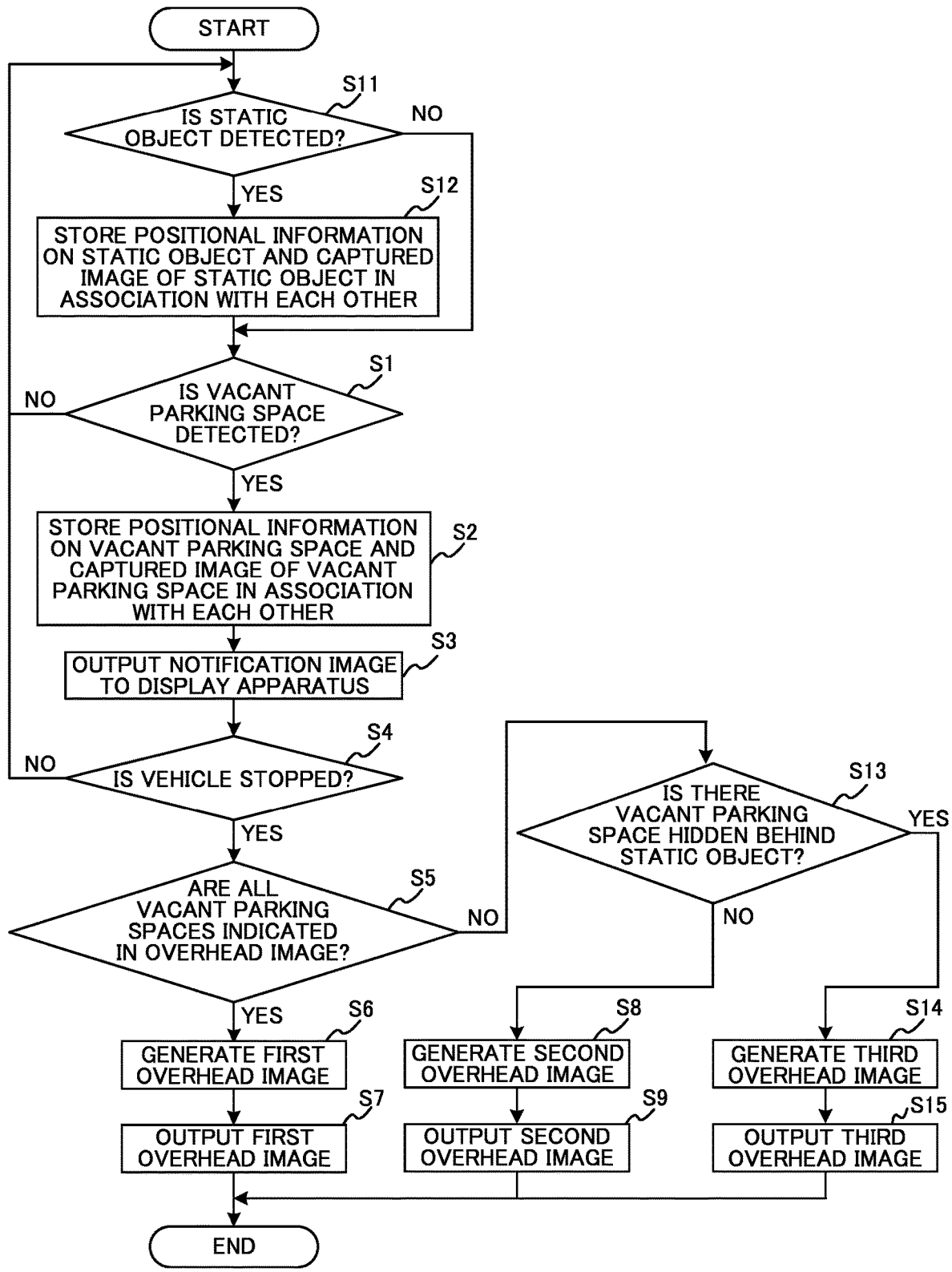
FIG. 5 is a flowchart illustrating an exemplary operation of a display control apparatus according to Variation 1 of the present disclosure.

An operation of display control apparatus 200 according to the present variation will be described with reference to FIG. 5. FIG. 5 is a flowchart illustrating an exemplary operation of display control apparatus 200 according to the present variation. FIG. 5 is a flowchart in which steps S11 to S15 are added to FIG. 3. In the following, steps S11 to S15 will be mainly described.

A flow of FIG. 5 starts at the beginning of a search for a vacant parking space. Note that, the respective kinds of processing by each camera, subject-vehicle position sensor 4, and detector 11 are repeatedly performed during the search for the vacant parking space.

First, determiner 16 determines whether a static object is detected by detector 11 (step S11).

In a case where a static object is detected by detector 11 (step S11: YES), receiver 14 receives positional information on the static object detected by detector 11 and a captured image of the static object captured by at least one of each camera to store them in storage 15 in association with each other (step S12). The processing of step S12 is performed for each detection of the static object.

Incidentally, in a case where the static object is not detected by detector 11 (step S11: NO), the flow proceeds to step S1.

Steps S1 to S7 have already been described with reference to FIG. 3 in the above embodiment, and thus description thereof will be omitted.

In this variation, in a case where not all the vacant spaces are indicated in an overhead image to be generated (step S5: NO), the flow proceeds to step S13.

Determiner 16 determines whether there is a vacant parking space hidden behind the static object as seen from the current position of vehicle 1 among the detected vacant parking spaces (step S13).

For example, determiner 16 determines, for each detected vacant parking space, whether the vacant parking space is hidden behind the static object on the basis of the subject-vehicle position information, the locational information on the vacant parking space, and positional information on the static object.

Here, a specific example of the case where the detected vacant parking space is hidden behind the static object will be described with reference to FIG. 1.

In FIG. 1, for example, in a situation where parking space BS1 is detected as a vacant parking space and vehicle 1 parks in front of parking space BS2, parking space BS1 is hidden behind parked vehicle V2 as seen from the position of vehicle 1. In this case, determiner 16 determines that parking space BS1 is hidden behind parked vehicle V2 based on the subject-vehicle positional information, the locational information on parking space BS1, and the positional information on parked vehicle V2.

Hereinafter, the description returns to FIG. 5.

In a case where there is no vacant parking space hidden behind the static object among the detected vacant parking spaces (step S13: NO), the flow proceeds to steps S8 and S9.

Steps S8 and S9 have already been described with reference to FIG. 3 in the above embodiment, and thus description thereof will be omitted.

In a case where there is a vacant parking space hidden behind the static object among the detected vacant parking spaces (step S13: YES), the flow proceeds to step S14.

Generator 17 generates the third overhead image based on the current position captured image, the past position captured image, and the subject-vehicle image (step S14).

Here, for step S14, a description will be given with an example in which the detected vacant parking spaces are two parking spaces BS1 and BS2 illustrated in FIG. 1, a captured image of parking space BS2 is included in the current position captured image, and the respective captured images of parked vehicles V1 and V2, and parking space BS1 are included in the past position captured image (e.g., parked vehicles V1 and V2, and parking space BS1 are outside the viewing angle of each camera in the current position of vehicle 1).

In addition, the respective captured images of parked vehicles V1 and V2 are assumed to be, for example, images captured when left side camera 3a is positioned at a center of a vehicle width direction of each of parked vehicles V1 and V2.

First, generator 17 performs, for example, distortion correction processing or projection conversion processing on the current position captured image read from storage 15 (including the captured image of parking space BS2 which is detected). Generator 17 then generates the first overhead image by combining the current position overhead image obtained by the processing (including the overhead image of parking space BS2 which is detected) and the subject-vehicle image read from storage 15. In this generation, generator 17 performs arrangement of the subject-vehicle image and the overhead image of parking space BS2 based on the subject-vehicle positional information received from subject-vehicle position sensor 4 (here, the information indicating the stopping position of vehicle 1) and the positional information of parking space BS2.

Next, generator 17 performs, for example, distortion correction processing or projection conversion processing on the current position captured image read from storage 15 (including the respective captured images of parking space BS1 and parked vehicles V1 and V2 which are detected). Generator 17 thereby obtains a past position overhead image (including the respective overhead images of parking space BS1 and parked vehicles V1 and V2 which are detected).

Generator 17 then generates the third overhead image by combining the past position overhead image (including the respective overhead images of parking space BS1 and parked vehicles V1 and V2 which are detected) with respect to the first overhead image including the subject-vehicle image and the current position overhead image (including the overhead image of parking space BS2). During this generation, generator 17 performs an arrangement of the overhead image of parking space BS1 and parked vehicles V1 and V2 based on the positional information on each of parking space BS1 and parked vehicles V1 and V2 read from storage 15. At this time, the respective images in the third overhead image may be adjusted (reduced) in size depending on a display range of an image on display apparatus 5.

Step S13 has been described above, but the processing order in step S13 is not limited to the above description.

Next, generator 17 outputs the third overhead image generated in step S13 to display apparatus 5 (step S15).

Figure 6:
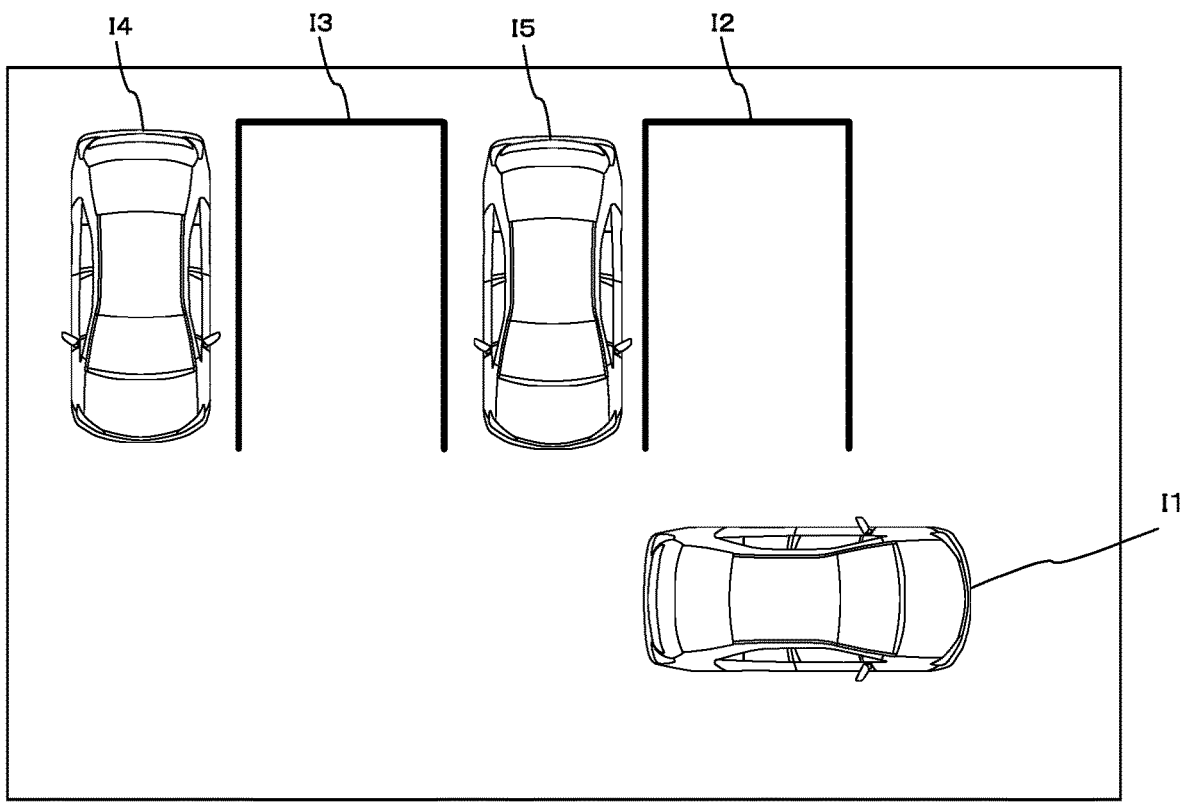
FIG. 6 is a schematic view of an exemplary overhead image according to Variation 1 of the present disclosure.

Thus, display apparatus 5 displays the third overhead image generated in step S13. FIG. 6 illustrates an example of the third overhead image displayed on display apparatus 5.

As illustrated in FIG. 6, the third overhead image includes parked vehicle image I4 indicating parked vehicle V1 and parked vehicle image I5 indicating parked vehicle V2, in addition to subject-vehicle image I1, parking space image I2, and parking space image I3 which are illustrated in FIG. 4.

Note that, for simplicity of description, FIG. 6 illustrates an exemplary case where parked vehicle images I4 and I5 clearly illustrate shapes of parked vehicles V1 and V2 respectively, but the present disclosure is not limited to this. Generally, when a captured image including a plane (e.g., parking space) is converted into an overhead image, the shape of the plane in the overhead image becomes a shape as seen from directly above, whereas, when a captured image including a three-dimensional object (e.g., parked vehicle) is converted into an overhead image, the shape of the three-dimensional object in the overhead image becomes a shape that differs from the shape as seen from directly above. For example, in a case where the captured image including a parked vehicle is converted into an overhead image, the shape of the parked vehicle in the overhead image is to be distorted (e.g., shape such as obliquely upward protrusion). Consequently, the respective shapes of parked vehicles V1 and V2 in parked vehicle images I4 and I5 may be distorted.

Furthermore, for example, in a case where parked vehicle image I5 overlaps with parking space image I3 due to a large distortion of the shape of parked vehicle V2 in parked vehicle image I5 (e.g., protrusion in a direction of the overhead image of parking space BS1), generator 17 may perform processing such as deleting an overlapped part with parking space image I3 in parked vehicle image I5 when generating the third overhead image. Thus, the third overhead image displayed on display apparatus 5 includes parked vehicle image I5 from which the overlapped part with parking space image I3 has been deleted.

Further, in the present variation, a description has been given with an example in which the overhead image generated based on the captured image of the static object (e.g., parked vehicle images I4 and I5), but the preset disclosure is not limited to this. A prepared parked vehicle image may be used. This parked vehicle image is, like subject-vehicle image I1, an overhead image of a predetermined vehicle.

The operation of display control apparatus 200 according to the present variation has been described above.

According to the present variation, in a case where the detected vacant parking space is hidden behind the static object as seen from the current position of vehicle 1, an image indicating the static object is also displayed in addition to the image indicating all the detected vacant parking spaces and the subject-vehicle image; thus, the occupant of vehicle 1 can recognize more easily the location of the detected vacant parking space.

[Variation 2]

In the embodiment and Variation 1, a description has been given with an example in which the notification image is output to display apparatus 5 when a vacant parking space is detected; however, output processing of the notification image may not be performed.

Moreover, in the embodiment and Variation 1, a description has been given with an example in which the determination processing of step S5 is performed with the stopping of vehicle 1 as a trigger after the vacant parking space is detected, but the present disclosure is not limited to this. For example, the determination processing of step S5 may be performed with an operation instructing the displaying of the overhead image by the occupant of vehicle 1 as a trigger.

Furthermore, the second overhead image or third overhead image may be continuously generated and displayed while vehicle 1 is traveling for searching for a vacant parking space. For example, the second overhead image may be updated so that an overhead image of a vacant parking space present within a predetermined range from the current position of vehicle 1 is displayed while vehicle 1 is traveling. In addition, for example, the third overhead image may be updated so that overhead images of a vacant parking space and a static object, which are present within a predetermined range from the current position of vehicle 1, are displayed while vehicle 1 is traveling.

[Variation 3]

FIG. 2 illustrates an exemplary case where display control apparatus 200 is included in parking assistance apparatus 100, but display control apparatus 200 and parking assistance apparatus 100 may be separate from each other. In this case, display control apparatus 200 receives information indicating processing results by detector 11 and determiner 16 from parking assistance apparatus 100 and performs the respective kinds of processing described above based on the information (e.g., the processing performed by each of determiner 16 and generator 17)

[Variation 4]

In the embodiment, a description has been given with an example in which detector 11 detects a vacant parking space or a static object based on the image captured by the vehicle-mounted camera (e.g., camera group 3), but the present disclosure is not limited to this. For example, in a case where vehicle 1 is equipped with a detecting device other than a vehicle-mounted camera, the vacant parking space or static object may be detected based on signals received from the detecting device. Examples of detecting devices other than the vehicle-mounted camera include, for example, a radar device that transmits radio waves to the periphery of vehicle 1 and receives the reflected waves or an ultrasound sonar that transmits sound waves to the periphery of vehicle 1 and receives the reflected waves. As the radar device, for example, a millimeter wave radar or laser radar may be used. The laser radar is also referred to as Light Detection and Ranging (LIDAR).

In order to further improve the detection accuracy, detector 11 may detect a vacant parking space or a static object based on both of images captured by the vehicle-mounted camera and signals indicating reflected waves received by the detecting device.

[Variation 5]

In the embodiment, a description has been given with an example in which vehicle 1 is a vehicle capable of performing automatic parking, but vehicle 1 may be a vehicle not capable of performing automatic parking. In this case, traveling controller 12 controls actuator group 6 based on operations for acceleration and deceleration, braking and steering by an occupant of vehicle 1.

Variations have been described above. Incidentally, the respective variations may be realized in combination as appropriate.

(Summary of the Present Disclosure)

The summary of the present disclosure is as follows.

A display control apparatus of the present disclosure includes: a receiver that, for each detection of a vacant parking space present in a periphery of a vehicle, receives locational information on the vacant parking space and a captured image of the vacant parking space captured by a camera mounted on the vehicle and stores, in a storage, the locational information on the vacant parking space and the captured image of the vacant parking space in association with each other; and a generator that generates an overhead image of the vacant parking space based on a captured image of the vacant parking space captured at a position where the vehicle has been positioned before a current point in time, generates a display overhead image including at least the overhead image of the vacant parking space and the overhead image of the vehicle based on positional information on each of the vacant parking space and the vehicle, and outputs the display overhead image to a display apparatus mounted on the vehicle, wherein the display overhead image to be displayed on the display apparatus includes at least one of an overhead image of the vacant parking space outside of a current viewing angle of the camera and an overhead image of the vacant parking space hidden behind a static object as seen from a current position of the vehicle.

In the display control apparatus of the present disclosure, the display overhead image is updated so that an overhead image of the vacant parking space present within a predetermined range from the current position of the vehicle is displayed while the vehicle is traveling.

In the display control apparatus of the present disclosure, the receiver, for each detection of a static object present in a periphery of the vehicle, receives positional information on the static object and a captured image of the static object captured by the camera and stores, in the storage, the positional information on the static object and the captured image of the static object in association with each other; and the generator generates an overhead image of the static object based on the captured image of the static object and outputs the overhead image of the static object to the display apparatus by further including the overhead image of the static object in the display overhead image based on the positional information on the static object.

In the display control apparatus of the present disclosure, the display overhead image to be displayed on the display apparatus includes an overhead image of the static object outside a viewing angle of the camera.

In the display control apparatus of the present disclosure, the display overhead image to be displayed on the display apparatus includes an overhead image of the static object from which an overlapped part with the overhead image of the vacant parking space has been deleted.

In the display control apparatus of the present disclosure, the display overhead image is updated so that overhead images respectively of the vacant parking space and the static object which are present within a predetermined range from the current position of the vehicle are displayed while the vehicle is traveling.

In the display control apparatus of the present disclosure, the vehicle is a vehicle that performs automatic parking in the vacant parking space.

A parking assistance apparatus of the present disclosure includes: a detector that detects a vacant parking space present in a periphery of a vehicle; a traveling controller that controls traveling of the vehicle and automatically parks the vehicle in the vacant parking space; a receiver that, for each detection of the vacant parking space by the detector, receives locational information on the vacant parking space and a captured image of the vacant parking space captured by a camera mounted on the vehicle and stores the locational information on the vacant parking space and the captured image of the vacant parking space in association with each other; and a generator that generates an overhead image of the vacant parking space based on a captured image of the vacant parking space captured at a position where the vehicle has been positioned before a current point in time, generates a display overhead image including at least the overhead image of the vacant parking space and the overhead image of the vehicle based on positional information on each of the vacant parking space and the vehicle, and outputs the display overhead image to a display apparatus mounted on the vehicle, wherein the display overhead image to be displayed on the display apparatus includes at least one of an overhead image of the vacant parking space outside of a current viewing angle of the camera and an overhead image of the vacant parking space hidden behind a static object as seen from a current position of the vehicle.

A display control method of the present disclosure is performed by an apparatus mounted on a vehicle, the display control method including: receiving, for each detection of a vacant parking space present in a periphery of the vehicle, locational information on the vacant parking space and a captured image of the vacant parking space captured by a camera mounted on the vehicle and storing the locational information on the vacant parking space and the captured image of the vacant parking space in association with each other; and generating an overhead image of the vacant parking space based on a captured image of the vacant parking space captured at a position where the vehicle has been positioned before a current point in time, generating a display overhead image including at least the overhead image of the vacant parking space and the overhead image of the vehicle based on positional information on each of the vacant parking space and the vehicle, and outputting the display overhead image to a display apparatus mounted on the vehicle, wherein the display overhead image to be displayed on the display apparatus includes at least one of an overhead image of the vacant parking space outside of a current viewing angle of the camera and an overhead image of the vacant parking space hidden behind a static object as seen from a current position of the vehicle.

While various embodiments have been described herein above, it is to be appreciated that various changes in form and detail may be made without departing from the spirit and scope of the invention(s) presently or hereafter claimed.

This application is entitled to and claims the benefit of Japanese Patent Application No. 2019-048278, filed on Mar. 15, 2019, the disclosure of which including the specification, drawings and abstract is incorporated herein by reference in its entirety.

INDUSTRIAL APPLICABILITY

A display control apparatus, a parking assistance apparatus and a display control method of the present disclosure is useful for assisting vehicles with parking.

The invention claimed is:

1. A vehicle control method for a vehicle control apparatus mounted on a vehicle, the vehicle control apparatus coupled with at least one camera and a display apparatus, the at least one camera and the display apparatus being mounted on the vehicle, the at least one camera configured to capture images of ambient areas of the vehicle, the vehicle control method comprising:
detecting a first available parking space, in accordance with a first image captured by the at least one camera at a first point in time;
detecting a second available parking space, in accordance with a second image captured by the at least one camera at a second point in time, the first point in time being before the second point in time and the vehicle travelling between the detecting of the first available parking space at the first point in time and the detecting of the second available parking space at the second point in time, the first available parking space being located in a first ambient area of the ambient areas, the second available parking space being located in a second ambient area of the ambient areas, the first ambient area being distinct from the second ambient area;
determining that, in the second image of the second ambient area captured by the at least one camera, the first available parking space is not detected; and
outputting, in response to the determining, a display image to the display apparatus, the display image being generated by combining plural images captured by the at least one camera, the display image including the first available parking space and the second available parking space.

2. The vehicle control method according to claim 1, wherein the vehicle control apparatus is further coupled with at least one actuator of
a motor actuator for acceleration and deceleration of the vehicle,
a brake actuator for braking of the vehicle, or
a steering actuator for steering of the vehicle, and
wherein the vehicle control method further comprises:
controlling the at least one actuator to park the vehicle in one of the first available parking space or the second available parking space, the one of the first available parking space or the second available parking space being selected by an occupant of the vehicle.

3. The vehicle control method according to claim 1, wherein
the display image is output by combining an overhead image and an image read from a storage.

4. The vehicle control method according to claim 1, wherein
an object is located between the vehicle and the first available parking space when the at least one camera captures the second image of the second ambient area in which the first available parking space is not located.

5. The vehicle control method according to claim 1, wherein
the vehicle control apparatus detects each of the first available parking space and the second available parking space, as a vacant parking space not being occupied by other vehicles.

6. The vehicle control method according to claim 1, wherein
the vehicle control apparatus generates the display image based on the images of the ambient areas of the vehicle, captured by the at least one camera.

7. The vehicle control method according to claim 1, wherein
the first available parking space is detected by the vehicle control apparatus, with first location information of the first available parking space, and
the second available parking space is detected by the vehicle control apparatus, with second location information of the second available parking space.

8. The vehicle control method according to claim 1, wherein
the display image includes an overhead image including the first available parking space and the second available parking space.

9. The vehicle control method according to claim 1, wherein
the vehicle control apparatus outputs the display image to the display apparatus, with the display image including the first available parking space and the second available parking space, while the vehicle is travelling and when the at least one camera captures the second image of the second ambient area in which the first available parking space is not located.

10. The vehicle control method according to 1, wherein the at least one camera includes a left-side camera for capturing left images of a left-side ambient area of the vehicle, a right-side camera for capturing right images of a right-side ambient area of the vehicle, a front camera for capturing front images of a front ambient area of the vehicle, and a rear camera for capturing rear images of a rear ambient area of the vehicle.

11. A vehicle control apparatus configured to be mounted on a vehicle, the vehicle control apparatus comprising:
an input configured to be coupled with at least one camera, the at least one camera being mounted on the vehicle, the at least one camera being configured to capture images of ambient areas of the vehicle;
an output configured to be coupled with a display apparatus, the display apparatus being mounted on the vehicle; and
a processor coupled with at least the input and the output, wherein
the processor detects a first available parking space, in accordance with a first image captured by the at least one camera at a first point in time,
the processor detects a second available parking space, in accordance with a second image captured by the at least one camera at a second point in time, the first point in time being before the second point in time and the vehicle travelling between the detecting of the first available parking space at the first point in time and the detecting of the second available parking space at the second point in time, the first available parking space being located in a first ambient area of the ambient areas, the second available parking space being located in a second ambient area of the ambient areas, the first ambient area being distinct from the second ambient area, the processor determines that, in the second image of the second ambient area captured by the at least one camera, the first available parking space is not detected, and the processor outputs, in response to determining that the first available parking space is not detected in the second image, a display image to the display apparatus, the display image being generated by combining plural images captured by the at least one camera, the display image including the first available parking space and the second available parking space.

12. The vehicle control apparatus according to claim 11, wherein the output of the vehicle control apparatus is further coupled with at least one actuator of
a motor actuator for acceleration and deceleration of the vehicle,
a brake actuator for braking of the vehicle, or
a steering actuator for steering of the vehicle, and
the vehicle control apparatus controls the at least one actuator to park the vehicle in one of the first available parking space or the second available parking space, the one of the first available parking or the second available parking space being selected by an occupant of the vehicle.

13. The vehicle control apparatus according to claim 11, wherein
the processor outputs the display image by combining an overhead image and an image read from a storage.

14. The vehicle control apparatus according to claim 11, wherein
an object is located between the vehicle and the first available parking space when the at least one camera captures the second image of the second ambient area in which the first available parking space is not located.

15. The vehicle control apparatus according to claim 11, wherein
the vehicle control apparatus detects each of the first available parking space and the second available parking space, as a vacant parking space not being occupied by other vehicles.

16. The vehicle control apparatus according to claim 11, wherein
the vehicle control apparatus generates the display image based on the images of the ambient areas of the vehicle, captured by the at least one camera.

17. The vehicle control apparatus according to claim 11, wherein
the first available parking space is detected by the vehicle control apparatus, with first location information of the first available parking space, and
the second available parking space is detected by the vehicle control apparatus, with second location information of the second available parking space.

18. The vehicle control apparatus according to claim 11, wherein
the display image includes an overhead image including the first available parking space and the second available parking space.

19. The vehicle control apparatus according to claim 11, wherein
the vehicle control apparatus outputs the display image to the display apparatus, with the display image including the first available parking space and the second available parking space, while the vehicle is travelling and when the at least one camera captures the second image of the second ambient area in which the first available parking space is not located.

20. The vehicle control apparatus according to 11, wherein
the at least one camera includes a left-side camera for capturing left images of a left-side ambient area of the vehicle, a right-side camera for capturing right images of a right-side ambient area of the vehicle, a front camera for capturing front images of a front ambient area of the vehicle, and a rear camera for capturing rear images of a rear ambient area of the vehicle.

* * * * *